(Model.)

J. M. DODGE.
CHAIN.

No. 255,950. Patented Apr. 4, 1882.

Witnesses:
E. C. Perkins
Jacob Felbel

Inventor:
Jas. M. Dodge
By atty
J. N. McIntire

UNITED STATES PATENT OFFICE.

JAMES M. DODGE, OF CHICAGO, ILLINOIS.

CHAIN.

SPECIFICATION forming part of Letters Patent No. 255,950, dated April 4, 1882.

Application filed January 30, 1882. (Model.)

*To all whom it may concern:*

Be it known that I, JAMES MAPES DODGE, of Chicago, in the county of Cook and State of Illinois, have invented certain new and useful Improvements in Chains; and I do hereby declare that the following is a full, clear, and exact description thereof, reference being had to the accompanying drawings, making part of this application.

My invention relates to improvements in that kind of detachable chain which is composed of alternately-arranged single and double bar links, and has for its main objects to produce a chain of this class which shall be exceedingly simple, light, and strong in its construction, while at the same time it can be cheaply manufactured and most conveniently used for the various purposes for which chains of this class are usually employed.

Previous to my invention chains of the class above mentioned have been made with the single-bar links of the chain formed with lateral semi-cylindrical projections at each end of such link, adapted to form the pintles or male members of the hinge-like joints of the chain; but the double or twin bar links, containing at either end the female members of the joints or articulations, have heretofore been made of two solid bars arranged in parallel planes and in line with single bars composing the other links of the chain.

I propose by my novel plan of construction to entirely dispense with the cumbersome form of double-bar link heretofore used in this class of chains, and to substitute therefor a novel form of link, which I will presently explain, and by means of which and a variation in the form of the pintle-like devices of the usual single-bar link I am enabled to form a chain which, while it is exceedingly light, strong, and durable, and economic of manufacture, can have its links easily uncoupled in only a very unusual relative position of them; and can also have its double-bar links made in two separate pieces that do not require to be permanently secured together.

To enable those skilled in the art to make and use my invention, I will now proceed to more fully explain it, referring by letters to the accompanying drawings, in which—

Figure 1:
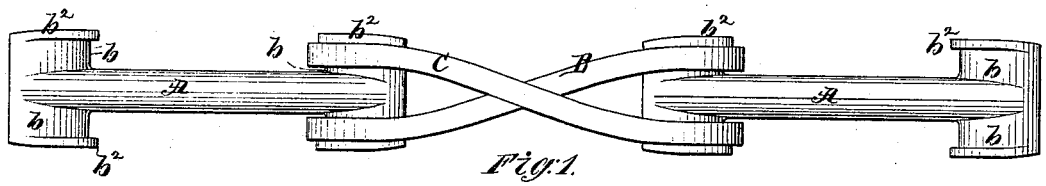
Figure 2:
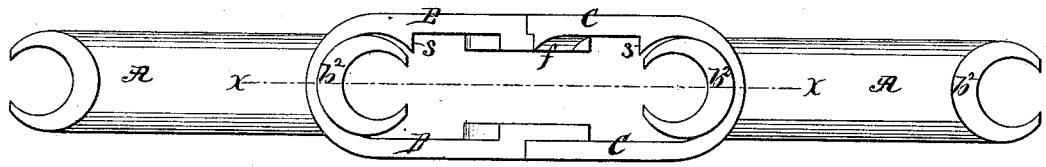
Figure 3:
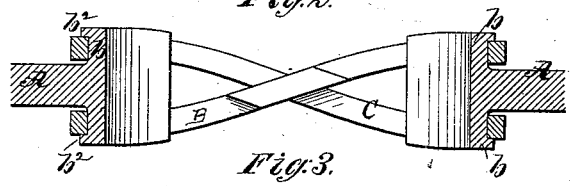
Figure 4:
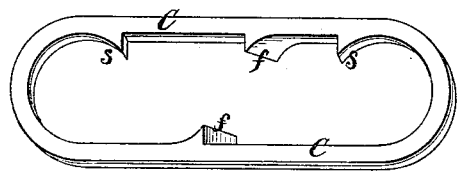
Figure 5:
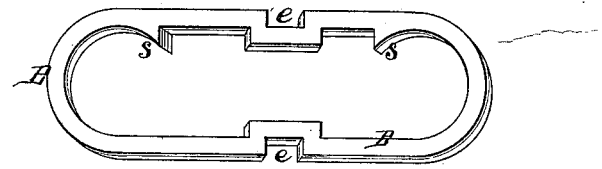
Figure 6:
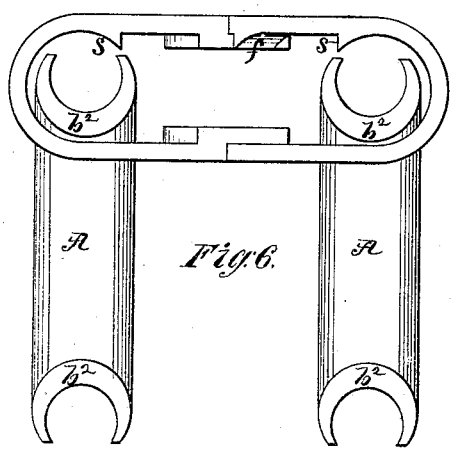

Figure 1 is a face view or plan of a chain made according to my invention. Fig. 2 is a side or edge view of the same. Fig. 3 is a horizontal section at the line $x\ x$ of Fig. 2. Fig. 4 is a detail view of one part or piece of the double-bar link. Fig. 5 is a similar view of the other piece of said link; and Fig. 6 is a side view of the chain, showing the positions into which the parts must be turned to effect a separation of them.

In the several figures the same part will be found designated by the same letter of reference.

A is the single-bar link of the chain. It is made, as shown, of a bar-like main portion or body and semi-cylindrical cross-heads $b$—one at each end—which portions $b$ form the male members of the chain-joints, and are provided with flanges at $b^2$, all as clearly shown. The double-bar links are made each of two quite oblong open links, B and C, each on the peculiar plan of construction shown. As will be seen by the drawings, the part B is formed with a sort of diagonally-arranged depression, $e$, in the outer surface of each side, and near the middle, within which may be placed the sides of the parts C when the two parts are arranged together in their working relationship, as seen at Figs. 1, 2, and 3.

The part C has at the interior surface of each of its sides and near the middle, lengthwise of the link, a projection or shoulder, $f$, and both parts, B and C, have retaining or keeper-like projections or devices on the inner surfaces of the parts and near the ends, as shown clearly at $s$. The two parts B and C are put together so as to cross each other, and with the part B passing through the part C, and the enlargements or projections $s$ operate to prevent the cross-heads or pintle-like devices $b$ of the links A from backing out of their bearings within the duplex ends of the double links, as shown, while the flanges $b^2$ of the pintle-like members of the articulation prevent the devices $b$ from slipping out of their bearings endwise.

An inspection of the drawings at Figs. 1, 2, 3, 4, and 5 will explain better than words can the conformation of each of the parts, and how they are arranged together in an operative or working combination; and by reference to Fig. 6 it will be seen that when any two single-bar links A shall be turned up and bodily moved into the relative position with an intermediate double-bar link (shown in said figure) the parts B and C of such double-bar link may have their adjacent or nearer ends spread apart, so that the pintle-like devices $b$ of the said single-bar links may be extricated from the ends of the parts B and C, and so that said parts may then also be entirely separated from each other. The parts B and C are not duplicates, though made from patterns very much alike; but all the links A are alike, and the chain-links composed of the parts B and C are of course duplicates.

It will be observed that when all the parts of the chain are put together they are not at all liable to any casual separation, but may be uncoupled, as already explained, designedly without difficulty, and without changing the structure of any part for any of the usual purposes.

The precise conformation shown need not of course be followed in practicing my invention, the essential features of the novel plan of construction resting in having the double-bar links made of two link-like devices, B and C, which need not be permanently fastened together, and which are adapted to be arranged together crosswise of each other, and so as to accommodate the pintle-like devices of the single-bar links within their open adjacent ends, the formation of the said pintle-like devices $b$ of the single links with flanges $b^2$, and their adaptation to fit and work within the loop-like ends of the parts B and C, and the employment of some such devices as the projections at $s$, and the interlocking depressions at $e$ and $f$, for the purposes, respectively, of preventing the pintles $b$ from backing out of their bearings, and for insuring the retention together of the parts B and C in a working relative position.

What I claim as new, and desire to secure by Letters Patent, is—

1. In a chain composed of alternate single-bar and double-bar links, a link composed of two open bars or devices, B and C, adapted for arrangement crosswise of each other, and operating, when so arranged, to accommodate within their adjacent ends the pintle-like devices of the single-bar links, substantially as set forth.

2. In combination with a double-bar link having loop-like ends to form the female members of articulation, a single-bar link having at its end a pintle-like device, $b$, provided with a retaining-flange, $b^2$, the whole constructed to operate substantially as set forth.

3. In combination with a link composed of two parts, B and C, and a link having a pintle-like device, $b$, the enlargements or projections $s$ of the two-part or double-bar link, for the purpose of preventing the backing out from its bearings in the ends of the two-part link of the pintle of the single-bar link.

In witness whereof I have hereunto set my hand this 5th day of January, 1882.

JAMES M. DODGE.

In presence of—
T. S. FAUNTLEROY,
GLENN G. HOWE.